US009276460B2

(12) United States Patent
Telefus

(10) Patent No.: US 9,276,460 B2
(45) Date of Patent: Mar. 1, 2016

(54) POWER CONVERTER WITH NOISE IMMUNITY

(75) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 586 days.

(21) Appl. No.: 13/481,015

(22) Filed: May 25, 2012

(65) Prior Publication Data

US 2013/0314059 A1 Nov. 28, 2013

(51) Int. Cl.
*H02M 1/12* (2006.01)
*H02M 1/44* (2007.01)
*H02M 1/00* (2007.01)

(52) U.S. Cl.
CPC ........ *H02M 1/44* (2013.01); *H02M 2001/0016* (2013.01)

(58) Field of Classification Search
CPC ....................................... H02M 1/44
USPC ........................... 363/39, 40, 44–48
See application file for complete search history.

(56) References Cited

U.S. PATENT DOCUMENTS

| 4,273,406 | A | 6/1981 | Okagami |
|---|---|---|---|
| 4,370,703 | A | 1/1983 | Risberg |
| 4,563,731 | A | 1/1986 | Sato et al. |
| 4,645,278 | A | 2/1987 | Yevak et al. |
| 4,712,160 | A | 12/1987 | Sato et al. |
| 4,788,626 | A | 11/1988 | Neidig et al. |
| 4,806,110 | A | 2/1989 | Lindeman |
| 4,841,220 | A | 6/1989 | Tabisz et al. |
| 4,857,822 | A | 8/1989 | Tabisz et al. |
| 4,866,367 | A | 9/1989 | Ridley et al. |
| 4,890,217 | A | 12/1989 | Conway |
| 4,893,227 | A | 1/1990 | Gallios et al. |
| 4,899,256 | A | 2/1990 | Sway-Tin |
| 4,901,069 | A | 2/1990 | Veneruso |
| 5,065,302 | A | 11/1991 | Kanazawa |

(Continued)

FOREIGN PATENT DOCUMENTS

| JP | 4217689 A | 8/1992 |
|---|---|---|
| JP | 10243640 A | 9/1998 |

(Continued)

OTHER PUBLICATIONS

"Novel Zero-Voltage and Zero-Current Switching (ZVZCS) Full-Bridge PWM Converter Using Coupled Output Inductor", by Hang-Seok Choi, IEEE Transactions on Power Electronics, vol. 17, No. 5, Sep. 2002, 4 pages.

(Continued)

*Primary Examiner* — Matthew Nguyen
(74) *Attorney, Agent, or Firm* — Haverstock & Owens LLP

(57) ABSTRACT

A power adapter system, method and device having two feedback loops that produces an output voltage on a load with a power converter using an input power. A feedback element coupled with the power converter comprises a first feedback loop that compensates for error on the output voltage. A noise detection element coupled with the power converter comprises a second feedback loop that detects noise and produces a noise feedback voltage based on the detected noise. Based on the noise feedback voltage a controller coupled with the power converter adjusts the operation of the power converter in order to compensate for or not respond to the effects of high frequency noise such as radio frequency noise on the first feedback loop of the system.

29 Claims, 2 Drawing Sheets

(56) References Cited

U.S. PATENT DOCUMENTS

| | | | |
|---|---|---|---|
| 5,090,919 A | 2/1992 | Tsuji | |
| 5,101,322 A | 3/1992 | Ghaem et al. | |
| 5,132,890 A | 7/1992 | Blandino | |
| 5,235,491 A | 8/1993 | Weiss | |
| 5,325,283 A | 6/1994 | Farrington | |
| 5,365,403 A | 11/1994 | Vinciarelli et al. | |
| 5,373,432 A | 12/1994 | Vollin | |
| 5,442,540 A | 8/1995 | Hua | |
| 5,673,185 A | 9/1997 | Albach et al. | |
| 5,712,772 A | 1/1998 | Telefus et al. | |
| 5,768,118 A | 6/1998 | Faulk et al. | |
| 5,786,992 A | 7/1998 | Vinciarelli et al. | |
| 5,790,395 A | 8/1998 | Hagen | |
| 5,811,895 A | 9/1998 | Suzuki et al. | |
| 5,838,554 A | 11/1998 | Lanni | |
| 5,859,771 A | 1/1999 | Kniegl | |
| 5,905,369 A | 5/1999 | Ishii et al. | |
| 5,923,543 A | 7/1999 | Choi | |
| 5,949,672 A | 9/1999 | Bertnet | |
| 6,009,008 A | 12/1999 | Pelly | |
| 6,091,611 A | 7/2000 | Lanni | |
| 6,183,302 B1 | 2/2001 | Daikuhara et al. | |
| 6,191,957 B1 | 2/2001 | Peterson | |
| 6,272,015 B1 | 8/2001 | Mangtani | |
| 6,275,397 B1 | 8/2001 | McClain | |
| 6,307,761 B1 | 10/2001 | Nakagawa | |
| 6,323,627 B1 | 11/2001 | Schmiederer et al. | |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,396,716 B1 | 5/2002 | Liu et al. | |
| 6,452,816 B2 | 9/2002 | Kuranuki | |
| 6,459,175 B1 | 10/2002 | Potega | |
| 6,487,098 B2 | 11/2002 | Malik et al. | |
| 6,549,409 B1 | 4/2003 | Saxelby et al. | |
| 6,650,552 B2 | 11/2003 | Takagi et al. | |
| 6,721,192 B1 | 4/2004 | Yang et al. | |
| 6,775,162 B2 | 8/2004 | Mihai et al. | |
| 6,894,461 B1 | 5/2005 | Hack et al. | |
| 6,919,715 B2 | 7/2005 | Muratov et al. | |
| 6,989,997 B2 | 1/2006 | Xu | |
| 7,035,126 B1 | 4/2006 | Lanni | |
| 7,038,406 B2 | 5/2006 | Wilson | |
| 7,061,195 B2 * | 6/2006 | Ho et al. | 318/438 |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,239,532 B1 | 7/2007 | Hsu et al. | |
| 7,274,175 B2 | 9/2007 | Manolescu | |
| 7,315,460 B2 | 1/2008 | Kyono | |
| 7,386,286 B2 | 6/2008 | Petrovic et al. | |
| 7,450,388 B2 | 11/2008 | Beihoff et al. | |
| 7,459,893 B2 * | 12/2008 | Jacobs | 323/282 |
| 7,499,301 B2 | 3/2009 | Zhou | |
| 7,545,256 B2 | 6/2009 | O'Toole et al. | |
| 7,564,706 B1 | 7/2009 | Herbert | |
| 7,596,007 B2 | 9/2009 | Phadke | |
| 7,701,305 B2 | 4/2010 | Lin et al. | |
| 7,924,578 B2 | 4/2011 | Jansen et al. | |
| 8,059,434 B2 | 11/2011 | Huang et al. | |
| 8,077,489 B2 * | 12/2011 | Pellen | 363/41 |
| 8,102,678 B2 | 1/2012 | Jungreis | |
| 8,125,181 B2 | 2/2012 | Gregg et al. | |
| 8,126,181 B2 | 2/2012 | Yamamoto et al. | |
| 8,134,848 B2 | 3/2012 | Whittam et al. | |
| 8,155,368 B2 | 4/2012 | Cheung et al. | |
| 8,194,417 B2 | 6/2012 | Chang | |
| 8,207,717 B2 | 6/2012 | Uruno et al. | |
| 8,213,666 B2 | 7/2012 | Groesch | |
| 8,243,472 B2 | 8/2012 | Chang et al. | |
| 8,344,689 B2 | 1/2013 | Boguslavskij | |
| 8,369,111 B2 | 2/2013 | Balakrishnan et al. | |
| 8,400,801 B2 | 3/2013 | Shinoda | |
| 8,410,768 B2 * | 4/2013 | Huber et al. | 323/284 |
| 2002/0008963 A1 | 1/2002 | DiBene, II et al. | |
| 2002/0011823 A1 | 1/2002 | Lee | |
| 2002/0036200 A1 | 3/2002 | Ulrich et al. | |
| 2003/0035303 A1 | 2/2003 | Balakrishnan et al. | |
| 2003/0112645 A1 | 6/2003 | Schlecht | |
| 2004/0062061 A1 | 4/2004 | Bourdillon et al. | |
| 2004/0149551 A1 * | 8/2004 | Porter | 200/1 R |
| 2004/0183510 A1 | 9/2004 | Sutardja et al. | |
| 2004/0252529 A1 | 12/2004 | Huber et al. | |
| 2005/0024016 A1 | 2/2005 | Breen et al. | |
| 2005/0036338 A1 | 2/2005 | Porter et al. | |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0254268 A1 | 11/2005 | Reinhard et al. | |
| 2005/0270001 A1 | 12/2005 | Jitaru | |
| 2006/0002155 A1 | 1/2006 | Shteynberg et al. | |
| 2006/0022637 A1 | 2/2006 | Wang et al. | |
| 2006/0152947 A1 | 7/2006 | Baker et al. | |
| 2006/0213890 A1 | 9/2006 | Kooken et al. | |
| 2006/0232220 A1 | 10/2006 | Melis | |
| 2007/0040516 A1 | 2/2007 | Chen | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0247091 A1 | 10/2007 | Maiocchi | |
| 2007/0263415 A1 | 11/2007 | Jansen et al. | |
| 2007/0287447 A1 | 12/2007 | Cornell | |
| 2007/0298653 A1 | 12/2007 | Mahoney et al. | |
| 2008/0018265 A1 | 1/2008 | Lee et al. | |
| 2008/0043496 A1 | 2/2008 | Yang | |
| 2008/0191667 A1 | 8/2008 | Kernahan et al. | |
| 2009/0034299 A1 | 2/2009 | Lev | |
| 2009/0196073 A1 | 8/2009 | Nakahori | |
| 2009/0290384 A1 | 11/2009 | Jungreis | |
| 2009/0290385 A1 | 11/2009 | Jungreis et al. | |
| 2010/0039833 A1 | 2/2010 | Coulson et al. | |
| 2010/0110732 A1 | 5/2010 | Moyer | |
| 2010/0289466 A1 | 11/2010 | Telefus et al. | |
| 2010/0317216 A1 | 12/2010 | Pocrass | |
| 2010/0322441 A1 | 12/2010 | Weiss et al. | |
| 2011/0132899 A1 | 6/2011 | Shimomugi et al. | |
| 2011/0261590 A1 | 10/2011 | Liu | |
| 2012/0112657 A1 | 5/2012 | Van Der Veen et al. | |
| 2013/0027011 A1 * | 1/2013 | Shih et al. | 323/282 |
| 2013/0148385 A1 | 6/2013 | Zhang | |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

"Analysis and Spectral Characteristics of a Spread-Spectrum Technique for Conducted EMI Suppression", K.K. Tse, Member IEEE, IEEE Transactions on Power Electronics, vol. 15, No. 2, Mar. 2000, 12 pages.

* cited by examiner

POWER CONVERTER WITH NOISE IMMUNITY

FIELD OF THE INVENTION

The present invention relates to the field of power supplies. More particularly, the present invention relates to a power converter system with a noise immunity feature.

BACKGROUND

Power adapters are devices that receive power from a power source and convert that power into an output power that is suitable for powering a load that is coupled to the power converter. In order to maintain stable operation, some power adapters include negative feedback components that limit the bandwidth of the power adapter to avoid amplification of high frequency noise such as radio frequency noise. However, this also means that the feedback components are unable to compensate for high frequency noise. As a result, the high frequency noise of the load and any ambient high frequency noise is able to disrupt the operation of the power adapter and thereby prevent the charging of the load by the power adapter. In particular, this is problematic with mobile phones that produce significant amounts of radio frequency transmissions that are able to become radio frequency noise on the negative feedback loop and thereby disrupt the operation of the power adapter.

SUMMARY OF THE INVENTION

A power adapter system, method and device having two feedback loops that produces an output voltage on a load with a power converter using an input power. A feedback element coupled with the power converter comprises a first feedback loop that compensates for error on the output voltage. A noise detection element coupled with the power converter comprises a second feedback loop that detects noise and produces a noise feedback voltage based on the detected noise. Based on the noise feedback voltage a controller coupled with the power converter adjusts the operation of the power converter in order to compensate for or not respond to the effects of high frequency noise such as radio frequency noise on the first feedback loop of the system. As a result, the power adapter system is immune or substantially immune to high frequency noise emanating from the load and ambient sources.

One aspect of the present invention is directed to a power adapter system. The power adapter system comprises a power supply for supplying an input power. A power converter is coupled with the power supply. The power converter produces an output voltage on a load using the input power. A controller is coupled with the power converter and a noise detection element is coupled with the controller. The noise detection element is configured to detect noise and produce a noise feedback voltage based on the detected noise. In response, the controller adjusts the operation of the power converter based on the noise feedback voltage. In some embodiments, the system further comprises a feedback element coupled with the power converter, wherein the feedback element detects the output voltage and produces a feedback signal that adjusts the operation of the power converter based on the output voltage. In some embodiments, the feedback element comprises the controller such that the controller receives both the output voltage and the noise feedback voltage. In some embodiments, the adjusting of the operation of the power converter based on the noise feedback voltage comprises not responding to the feedback signal for a period. In some embodiments, the period comprises the length of time the noise detection element produces the noise feedback voltage. In some embodiments, the adjusting of the operation of the power converter based on the noise feedback voltage comprises compensating for the detected noise. In some embodiments, the noise feedback voltage comprises a predetermined range of voltages that are different than the output voltage. In some embodiments, the load comprises a noise source that produces at least a portion of the noise having a source noise frequency range, and further wherein the noise detection element is configured to only produce the noise feedback voltage if the detected noise is within the source noise frequency range. In some embodiments, the structure of a sensor of the noise detection element mirrors the structure of the noise source such that the sensor is tuned to detect the output of the noise source. In some embodiments, the power converter, the controller, the noise detection element and the feedback element are a part of a single integrated circuit.

A second aspect of the present invention is directed to a power adapter. The power adapter comprises a power converter coupled with a power supply, wherein the power converter produces an output voltage on a load using an input power provided by the power supply. A controller is coupled with the power converter and a noise detection element coupled with the controller. The noise detection element is configured to detect noise and produce a noise feedback voltage based on the detected noise, wherein the controller adjusts the operation of the power converter based on the noise feedback voltage. In some embodiments, the power adapter further comprises a feedback element coupled with the power converter, wherein the feedback element detects the output voltage and produces a feedback signal that adjusts the operation of the power converter based on the output voltage. In some embodiments, the feedback element comprises the controller such that the controller receives both the output voltage and the noise feedback voltage. In some embodiments, the adjusting of the operation of the power converter based on the noise feedback voltage comprises not responding to the feedback signal for a period. In some embodiments, the period comprises the length of time the noise detection element produces the noise feedback voltage. In some embodiments, the adjusting of the operation of the power converter based on the noise feedback voltage comprises compensating for the detected noise. In some embodiments, the noise feedback voltage comprises a predetermined range of voltages that are different than the output voltage. In some embodiments, the load comprises a noise source that produces at least a portion of the noise having a source noise frequency range, and further wherein the noise detection element is configured to only produce the noise feedback voltage if the detected noise is within the source noise frequency range. In some embodiments, the structure of a sensor of the noise detection element mirrors the structure of the noise source such that the sensor is tuned to detect the output of the noise source.

A third aspect of the present invention is directed to a method of providing a high frequency noise immunity feature to a power adapter. The method comprises producing an output voltage on a load with a power converter using an input power provided by a power supply, detecting noise with a noise detection element and producing a noise feedback voltage based on the detected noise with the noise detection element and adjusting the operation of the power converter with a controller based on the noise feedback voltage. In some embodiments, the method further comprises detecting the output voltage and producing a feedback signal with the feedback element, wherein the feedback signal is configured to adjust the operation of the power converter based on the output voltage. In some embodiments, the feedback element comprises the controller and the controller receives both the output voltage and the noise feedback voltage. In some embodiments, the adjusting of the operation of the power converter based on the noise feedback voltage comprises not responding to the feedback signal for a period. In some embodiments, the period comprises the length of time the noise detection element produces the noise feedback voltage. In some embodiments, the adjusting of the operation of the power converter based on the noise feedback voltage comprises compensating for the detected noise. In some embodiments, the noise feedback voltage comprises a predetermined range of voltages that are different than the output voltage. In some embodiments, the load comprises a noise source that produces at least a portion of the noise having a source noise frequency range, and further wherein the noise detection element only produces the noise feedback voltage if the detected noise is within the source noise frequency range. In some embodiments, the structure of a sensor of the noise detection element mirrors the structure of the noise source such that the sensor is tuned to detect the output of the noise source. In some embodiments, the power converter, the controller, the noise detection element and the feedback element are a part of a single integrated circuit.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order to not obscure the description of the invention with unnecessary detail. In particular, it should be noted that although the power adapter system, device and method is described herein in references to input, output and reference voltages, it is understood that the system, device and method are able to similarly operate in reference to input, output and reference currents and/or voltages.

Embodiments of a power adapter system, method and device having two feedback loops in order to implement a high frequency noise immunity feature are described herein. The power adapter system uses a first feedback loop to correct errors on an output voltage of the adapter used to power a selectively coupled load. Simultaneously, the power adapter system uses a noise detection element coupled with the power converter to form a second feedback loop to detect high frequency noise and produce a noise feedback voltage based on the detected noise. Based on the noise feedback voltage, a controller coupled with the power converter adjusts the operation of the power converter in order to compensate for or not respond to the effects of the high frequency noise on the first feedback loop. As a result, the power adapter system, method and device is immune to high frequency noise emanating from the load and ambient sources.

Figure 1:
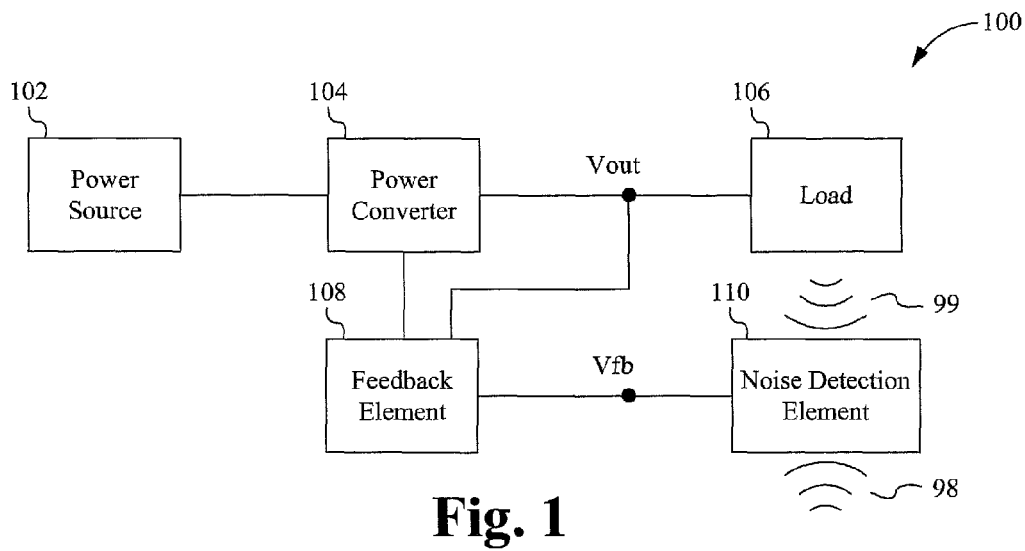
FIG. 1 illustrates a functional block diagram of a power adapter system according to some embodiments.

FIG. 1 illustrates a functional block diagram of a power adapter system 100 according to some embodiments. As shown in FIG. 1, the system 100 comprises a power source 102, a power converter 104, a load 106, a feedback element 108 and a noise detection element 110. The power source 102 is electrically coupled with the power converter 104 which is selectively electrically coupled with the load 106 to provide the output voltage $V_{out}$ to the load 106. The feedback element 108 is electrically coupled with the power converter 104 forming a first feedback loop such that the feedback element 108 is able to detect the output voltage $V_{out}$ and transmit a command signal to the power converter 104 based on the detected output voltage $V_{out}$. The noise detection element 110 is electrically coupled with the power converter 104 through the feedback element 108 forming a second feedback loop such that the noise detection element 110 is able to detect high frequency noise 99 such as radio frequency noise emanating from the load 106 and/or an ambient high frequency noise source 98 and transmit a noise feedback voltage $V_{fb}$ to the feedback element 108 based on the detected high frequency noise 99, 98. In some embodiments, two or more of the power converter 104, the feedback element 108 and the noise detection element 110 are integrated on a single integrated circuit. Alternatively, one or more of the power converter 104, the feedback element 108 and the noise detection element 110 are able to be on separate integrated circuits. In some embodiments, the noise detection element 110 electrically couples with the power converter 104 directly.

The power source 102 is able to comprise an AC power source such as a main line or plug outlet. Alternatively, the power source 102 is able to comprise a DC power supply. The power converter 104 is able to comprise a power converter circuit, such as a flyback converter. Alternatively, the power converter 104 is able to comprise other types of circuits that include power converters as are well known in the art. For example, the power converter 104 is able to comprise a forward converter, a push-pull converter, a half-bridge converter, a full-bridge converter and/or other configurations of switch mode power supplies as are well known in the art. The feedback element 108 is able to comprise a negative feedback loop circuit as are well known in the art. In some embodiments, the load 106 is an electronic device comprising a radio frequency or other high frequency transmission apparatus. Alternatively, the load 106 is able to comprise a mobile phone, laptop, set top box, television or other type of electronic device. In some embodiments, the noise detection element 110 comprises a passive or active high frequency noise detection circuit for detecting and inputting high frequency noise and a frequency to voltage converter for converting the inputted high frequency noise into a predetermined voltage or voltages. Alternatively, the noise detection element 110 is able to comprise other types of circuits capable of detecting and manipulating high frequency noise as are well known in the art.

In operation, the power converter 104 draws power from the power source 102 and produces an output voltage $V_{out}$ that is able to be used to power the load 106. The feedback element 108 monitors the output voltage $V_{out}$ and transmits a command signal to the power converter 104 in order to continuously adjust the operation of the power converter such that the output voltage $V_{out}$ equals a desired output voltage. Concurrently, the noise detection element 110 continuously determines if any high frequency noise 99, 98 from the load 106 and/or an ambient source is detected. When the noise detection element 110 detects high frequency noise 99, 98 the noise detection element 110 converts the noise detected into a noise feedback signal and couples the noise feedback signal to the power converter 104 and/or feedback element 108. The power converter 104 and/or feedback element 108 monitor the noise feedback voltage $V_{fb}$ of the noise feedback signal and dynamically adjust the operation of the power adapter system 100 when the detected noise feedback voltage $V_{fb}$ indicates the presence of high frequency noise 99, 98 that is able to disrupt the normal operation of the power adapter system 100. As a result, the system 100 provides the advantage of preventing high frequency noise from interfering with the operation of the power adapter system 100.

In some embodiments, the noise detection element 110 only outputs the noise feedback signal if the detected high frequency noise 99, 98 is within a predefined frequency range and/or above a predefined signal strength threshold that correspond to high frequency noise 99, 98 that are harmful to the operation of the system 100. For example, the predefined frequency range is able to correspond to the frequency range at which the load 106 produces high frequency signals and/or resonance frequencies thereof. Specifically, in some embodiments the predefined frequency range is able to be cell phone transmission radio frequencies between 300 to 3000 MHz. Alternatively, the predefined frequency range is able to correspond to other radio frequencies or high frequencies. In some embodiments, the noise feedback voltage $V_{fb}$ of the noise feedback signal output by the noise detection element 110 is a predetermined voltage level. For example, the noise detection element 110 is able to be configured such that noise feedback voltage $V_{fb}$ is a preselected delta voltage different than the normal range of the output voltage $V_{out}$. In some embodiments, the delta voltage is able to be selected such that the noise voltage $V_{fb}$ is at least forty percent less or greater than the output voltage $V_{out}$. Alternatively, the delta voltage is able to be selected such that the noise voltage $V_{fb}$ is at least 5, 10 or other percent less or greater than the output voltage $V_{out}$. In particular, the difference in voltage enables the noise feedback voltage $V_{fb}$ to be easily distinguished from the output voltage $V_{out}$ by the feedback element 108 and/or power converter 104.

Alternatively, the noise detection element 110 is able to continuously output the noise feedback signal regardless of whether the detected high frequency noise 99, 98 is within a predefined frequency range and/or above a predefined signal strength threshold. In particular, the noise detection element 110 is able to be configured to output a noise feedback voltage $V_{fb}$ within a predetermined voltage level range when the detected high frequency noise 99, 98 is within a predefined frequency range and/or above a predefined signal strength threshold that correspond to high frequency noise 99, 98 that is harmful to the operation of the system 100. Further, in such embodiments the power converter 104 and/or feedback element 108 are able to be configured to determine and appropriately adjust the operation of the system 100 only if the detected noise feedback voltage $V_{fb}$ is within the predetermined voltage level range.

In some embodiments, the adjustment of the operation of the system 100 in response to the detected noise feedback voltage $V_{fb}$ comprises compensating for the effects of the detected high frequency noise 99, 98 on the power converter 104 and/or feedback element 108 signals. For example, the system 100 is able to be adjusted such that gain loop network is penetrated in order to temporarily achieve greater or open system bandwidth. Alternatively, the adjustment of the operation of the system 100 in response to the detected noise feedback voltage $V_{fb}$ is able to comprise causing the system to temporarily stop operation until the detected noise feedback voltage $V_{fb}$ no longer indicates the detection of harmful high frequency noise 99, 98. Alternatively, the adjustment of the operation of the system 100 in response to the detected noise feedback voltage $V_{fb}$ is able to comprise other methods of preventing the detected high frequency noise 99, 98 from disrupting operation of the system 100 as are well known in the art.

Figure 2:
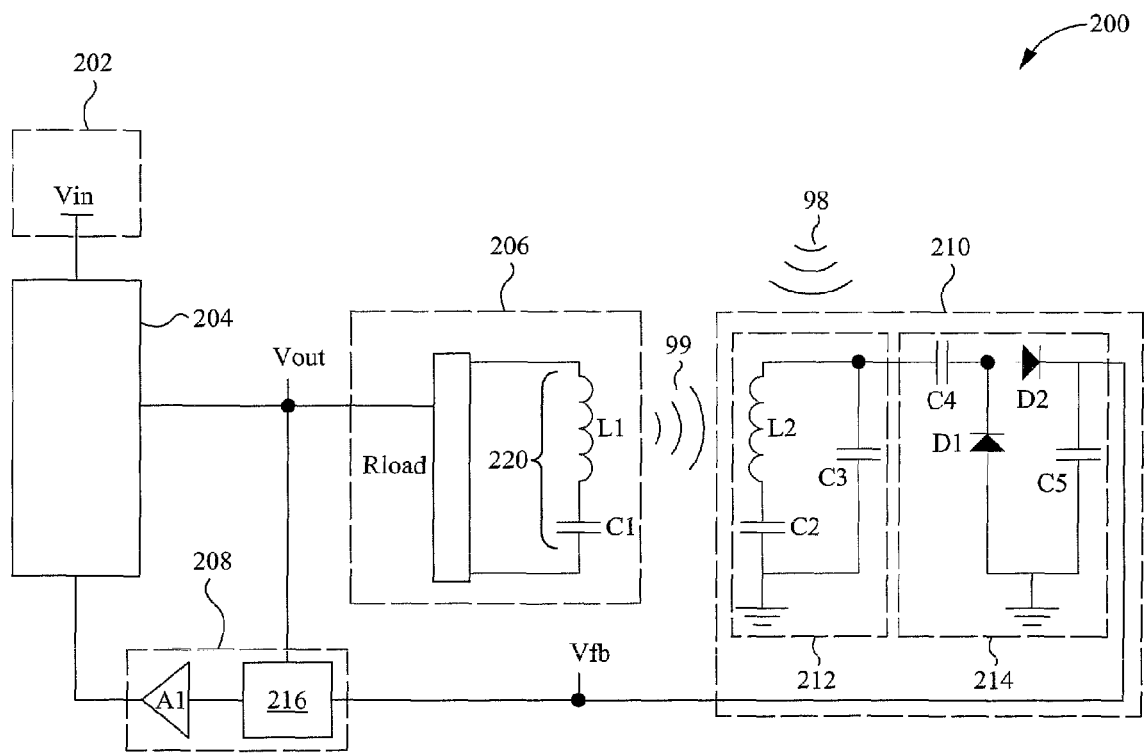
FIG. 2 illustrates a circuit diagram of the power adapter system according to some embodiments.

FIG. 2 illustrates a schematic diagram of a power adapter system 200 according to some embodiments. The schematic diagram is substantially similar to the functional block diagram shown in FIG. 1 except the additional details described herein. However, it is understood that alternative schematics are able to be used to implement the functional blocks of FIG. 2. As shown in FIG. 2, the power adapter system 200 comprises a power source 202, a power converter 204, a load 206, a feedback element 208 and a noise detection element 210. In some embodiments, the system 200 is contained on a single integrated circuit. Alternatively, one or more of the components of the system 200 are able to be separate integrated circuits such that the system 200 is formed by multiple integrated circuits electrically coupled together.

The power source 202 comprises an input voltage $V_{in}$ that is electrically coupled to the power converter 204. The load 206 comprises a resistor $R_{load}$ that represents the resistance provided by the load 206 and a high frequency transmission component 220. In some embodiments, the high frequency transmission component 220 comprises an inductor L1 and a capacitor C1 forming an antenna. Alternatively, the high frequency transmission component 220 is able to comprise other elements capable of transmitting high frequency signals as are well known in the art. Additionally, it is understood that the load 206 is able to comprise numerous different combinations of circuitry that are able to be represented by the resistance of the resistor $R_{load}$ and the high frequency transmission component 220, the details of which have been omitted for the sake of clarity. The feedback element 208 comprises an amplifier A1 for determining the error on the output voltage $V_{out}$ and a controller 216 for providing a first feedback loop and receiving the output voltage signal and the noise feedback signal. Alternatively, the controller 216 is able to be a part of the noise detection element 210 such that the voltage output signal is received directly by the amplifier A1 and the controller 216 only receives the noise feedback signal. Alternatively, the controller 216 is able to be a part of the power converter 204 or omitted such that the noise feedback signal is transmitted directly to the power converter 204. In some embodiments, the controller 216 comprises a current fed switch that operates based on the current received via the noise feedback signal. Alternatively, the controller 216 is able to comprise a comparator or other types of components able to monitor, compare and manipulate the noise feedback voltage $V_{fb}$ and/or the output voltage $V_{out}$ as are well known in the art. The power converter 204 comprises a flyback converter. Alternatively, the power converter 104 is able to comprise other types of power converting circuits as are well known in the art.

The noise detection element 210 comprises a high frequency sensor 212 and a signal converter element 214. In some embodiments, the high frequency sensor 212 is passive and comprises an inductor L2, a capacitor C2 and a capacitor C3. Alternatively, the high frequency sensor 212 is able to be active or passive and comprise other signal detecting components (e.g. transponders, transceivers, receivers) as are well known in the art. In some embodiments, the one or more of the components of the high frequency sensor 212 match the components of the high frequency transmission component 220 such that the voltage and/or signal used to generate the high frequency signals/noise of the high frequency transmission component 220 are able to be replicated by the high frequency sensor 212 upon receiving the high frequency signals/noise. For example, the structure and size of the inductor L1 and capacitor C1 of the high frequency transmission component 220 are able to be matched or duplicated by the inductor L2 and capacitor C2 of the high frequency sensor 212. In some embodiments, the signal converter element 214 comprises a frequency to voltage converter. For example, the signal converter element 214 is able to comprise a capacitor C4, a diode D1, a diode D2 and a capacitor C5 for converting the detected high frequency noise 99, 98 to the noise feedback signal. Alternatively, the signal converter element 214 is able to comprise other signal conversion circuits capable of converting high frequency signals as are well known in the art. Additionally, it is understood that one or more of the components of the power source 202, the power converter 204, the load 206, noise detection element 210 and/or the feedback element 208 are able to be positioned or duplicated on one or more of the other elements 202-210.

The input voltage $V_{in}$ is electrically coupled with the power converter 204, which is electrically coupled with the load resistance $R_{load}$ in order to provide the output voltage $V_{out}$ to the load 206 thereby powering the load 206. The inductor L1 and capacitor C1 of the high frequency transmission component 220 are electrically coupled in series to the load resistance $R_{load}$ in order to transmit the high frequency signals 99 of the load 206. The capacitor C2 is electrically coupled between ground and the inductor L2 which is electrically coupled with the output to the signal converter element 214. The capacitor C3 is also electrically coupled between ground and the output to the signal converter element 214. The capacitor C4 is electrically coupled between the output of the high frequency signal sensor 212 and the anode terminal of diode D2 and the cathode terminal of diode D1 whose anode terminal is electrically coupled to ground. The cathode terminal of diode D2 is electrically coupled with ground via the capacitor C5 and the controller 216 of the feedback element 208 in order to output the noise feedback voltage $V_{fb}$ of the noise feedback signal to the controller 216. The controller 216 is electrically coupled to the input of the power converter 204 via the amplifier A1 and to the outputs of the power converter 204 and the noise detection element 210 in order to receive the output voltage $V_{out}$ and the noise feedback voltage $V_{fb}$.

In operation, when the load 206 is coupled to the power converter 204, the power converter 204 outputs an output voltage $V_{out}$ to the load 206 using the input voltage $V_{in}$ from the power source 202. The controller 216 within the first feedback loop monitors the output voltage $V_{out}$ and in cooperation with the amplifier A1 compensates for any error detected in the output voltage $V_{out}$ thereby maintaining the output voltage at a desired voltage level required by the load 206 for operation/charging. Concurrently, the high frequency sensor 212 of the noise detection element 110 within the second feedback loop continuously detects/inputs any high frequency noise 99 transmitted from the high frequency transmission component 220 of the load 106 and/or high frequency noise 98 transmitted from an ambient source and transmits noise signals corresponding to the detected noise 99, 98 to the signal converter element 214. In response to receiving the noise signals from the high frequency sensor 212, the signal converter element 214 converts the noise signals into a noise feedback signal and outputs the noise feedback signal to the controller 216 of the feedback element 108. Alternatively, the signal converter element 214 is able to output the noise feedback signal directly to the power converter 204. As a result, the controller 216 of the feedback element 108 is able to monitor the noise feedback voltage $V_{fb}$ of the received noise feedback signal and produce a control signal that dynamically adjusts the operation of the power converter 204 and/or feedback element 208 forming the first feedback loop when the detected noise feedback voltage $V_{fb}$ indicates the presence of high frequency noise 99, 98 that is able to disrupt the normal operation of the power adapter system 200. As a result, the system 200 provides the advantage of preventing high frequency noise 99, 98 from interfering with the operation of the power adapter system 200.

In some embodiments, the adjustment of the operation of the system 200 in response to the detected noise feedback voltage $V_{fb}$ comprises compensating for the effects of the detected high frequency noise 99, 98 on the power converter 204 and/or feedback element 208 signals. For example, the system 200 is able to be adjusted such that gain loop network is penetrated in order to temporarily achieve greater or open loop bandwidth. Alternatively, the adjustment of the operation of the system 200 in response to the detected noise feedback voltage $V_{fb}$ is able to comprise causing the power converter 204 and/or feedback element 208 to temporarily stop operation until the detected noise feedback voltage $V_{fb}$ no longer indicates the detection of harmful high frequency noise 99, 98. Alternatively, the adjustment of the operation of the system 200 in response to the detected noise feedback voltage $V_{fb}$ is able to comprise other methods of preventing the detected high frequency noise 99, 98 from disrupting operation of the system 200 as are well known in the art.

Figure 3:
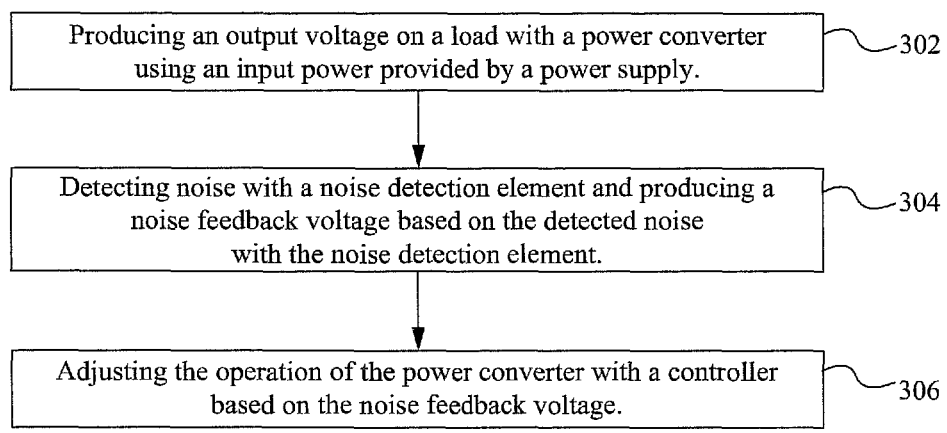
FIG. 3 illustrates a flowchart of a method of providing a high frequency noise immunity feature to a power adapter according to some embodiments.

FIG. 3 illustrates a flow chart of a method of providing a high frequency noise immunity feature to a power adapter according to some embodiments. At the step 302, the power converter 204 produces an output voltage $V_{out}$ on the load 206 using an input power provided by the power supply 202. In some embodiments, the feedback element 208 detects the output voltage $V_{out}$ and produces a control signal based on the detected output voltage $V_{out}$ that causes the power converter 204 to correct any error in the detected output voltage $V_{out}$. At the step 304, the noise detection element 210 continuously detects high frequency noise 99, 98 from the load 206 and/or an ambient source and produces a noise feedback voltage $V_{fb}$ based on the detected noise 99, 98. At the step 306, the controller 216 of the feedback element 208 and/or power converter 204 adjusts the operation of the power converter 204 and/or the feedback element 208 based on the noise feedback voltage $V_{fb}$. As a result, the method provides the benefit of preventing high frequency noise 99, 98 from interfering with the operation of the power adapter system 200. In some embodiments, the feedback element 208 comprises the controller 216 and the controller 216 receives both the output voltage $V_{out}$ and the noise feedback voltage $V_{fb}$. In some embodiments, the adjusting of the operation of the power converter 204 based on the noise feedback voltage $V_{fb}$ comprises not responding to the output voltage $V_{out}$ for a period. In some embodiments, the period comprises the length of time the noise detection element 210 produces the noise feedback voltage $V_{fb}$. In some embodiments, the adjusting of the operation of the power converter 204 and/or feedback element 208 based on the noise feedback voltage $V_{fb}$ comprises compensating for the detected noise 99, 98. In some embodiments, the noise feedback voltage $V_{fb}$ comprises a predetermined range of voltages that are different than the output voltage $V_{out}$ by a predetermined delta voltage. In some embodiments, the load 206 comprises a noise source 220 that produces at least a portion of the noise 99, 98 having a source noise frequency range, and further wherein the noise detection element 210 only produces the noise feedback voltage $V_{fb}$ if the detected noise 99, 98 is within the source noise frequency range.

Accordingly, the power adapter method, apparatus and system described herein has many advantages. Specifically, the system provides the benefit of preventing high frequency noise from interfering with the operation of the power adapter system. In particular, the system provides this benefit while not having to increase the normal operation bandwidth of the adapter system which would sacrifice the stability of its operation. Accordingly, the power adapter method, system and apparatus described herein has numerous advantages.

The power adapter system has been described in terms of specific embodiments incorporating details to facilitate the understanding of the principles of construction and operation of the power adapter system. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiments chosen for illustration without departing from the spirit and scope of the power adapter system.

What is claimed is:

1. A power adapter system comprising:
   a. a power supply for supplying an input power;
   b. a power converter coupled with the power supply, wherein the power converter produces an output voltage on a load using the input power;
   c. a controller coupled with the power converter; and
   d. a noise detection element coupled with the controller, wherein the noise detection element is configured to detect noise and produce a noise feedback voltage based on the detected noise;
   wherein the controller adjusts the operation of the power converter based on the noise feedback voltage.

2. The system of claim 1, further comprising a feedback element coupled with the power converter, wherein the feedback element detects the output voltage and produces a feedback signal that adjusts the operation of the power converter based on the output voltage.

3. The system of claim 2, wherein the feedback element comprises the controller such that the controller receives both the output voltage and the noise feedback voltage.

4. The system of claim 2, wherein the adjusting of the operation of the power converter based on the noise feedback voltage comprises not responding to the feedback signal for a period.

5. The system of claim 4, wherein the period comprises the length of time the noise detection element produces the noise feedback voltage.

6. The system of claim 1, wherein the adjusting of the operation of the power converter based on the noise feedback voltage comprises compensating for the detected noise.

7. The system of claim 1, wherein the noise feedback voltage comprises a predetermined range of voltages that are different than the output voltage.

8. The system of claim 1, wherein the load comprises a noise source that produces at least a portion of the noise having a source noise frequency range, and further wherein the noise detection element is configured to only produce the noise feedback voltage if the detected noise is within the source noise frequency range.

9. The system of claim 8, wherein the structure of a sensor of the noise detection element mirrors the structure of the noise source such that the sensor is tuned to detect the output of the noise source.

10. The system of claim 2, wherein the power converter, the controller, the noise detection element and the feedback element are a part of a single integrated circuit.

11. A power adapter comprising:
   a. a power converter coupled with a power supply, wherein the power converter produces an output voltage on a load using an input power provided by the power supply;
   b. a controller coupled with the power converter; and
   c. a noise detection element coupled with the controller, wherein the noise detection element is configured to detect noise and produce a noise feedback voltage based on the detected noise;
   wherein the controller adjusts the operation of the power converter based on the noise feedback voltage.

12. The power adapter of claim 11, further comprising a feedback element coupled with the power converter, wherein the feedback element detects the output voltage and produces a feedback signal that adjusts the operation of the power converter based on the output voltage.

13. The power adapter of claim 12, wherein the feedback element comprises the controller such that the controller receives both the output voltage and the noise feedback voltage.

14. The power adapter of claim 12, wherein the adjusting of the operation of the power converter based on the noise feedback voltage comprises not responding to the feedback signal for a period.

15. The power adapter of claim 14, wherein the period comprises the length of time the noise detection element produces the noise feedback voltage.

16. The power adapter of claim 11, wherein the adjusting of the operation of the power converter based on the noise feedback voltage comprises compensating for the detected noise.

17. The power adapter of claim 11, wherein the noise feedback voltage comprises a predetermined range of voltages that are different than the output voltage.

18. The power adapter of claim 11, wherein the load comprises a noise source that produces at least a portion of the noise having a source noise frequency range, and further wherein the noise detection element is configured to only produce the noise feedback voltage if the detected noise is within the source noise frequency range.

19. The power adapter of claim 18, wherein the structure of a sensor of the noise detection element mirrors the structure of the noise source such that the sensor is tuned to detect the output of the noise source.

20. A method of providing a high frequency noise immunity feature to a power adapter, the method comprising:
   a. producing an output voltage on a load with a power converter using an input power provided by a power supply;
   b. detecting noise with a noise detection element and producing a noise feedback voltage based on the detected noise with the noise detection element; and
   c. adjusting the operation of the power converter with a controller based on the noise feedback voltage.

21. The method of claim 20, further comprising detecting the output voltage and producing a feedback signal with the feedback element, wherein the feedback signal is configured to adjust the operation of the power converter based on the output voltage.

22. The method of claim 21, wherein the feedback element comprises the controller and the controller receives both the output voltage and the noise feedback voltage.

23. The method of claim 21, wherein the adjusting of the operation of the power converter based on the noise feedback voltage comprises not responding to the feedback signal for a period.

24. The method of claim 23, wherein the period comprises the length of time the noise detection element produces the noise feedback voltage.

25. The method of claim 20, wherein the adjusting of the operation of the power converter based on the noise feedback voltage comprises compensating for the detected noise.

26. The method of claim 20, wherein the noise feedback voltage comprises a predetermined range of voltages that are different than the output voltage.

27. The method of claim 20, wherein the load comprises a noise source that produces at least a portion of the noise having a source noise frequency range, and further wherein the noise detection element only produces the noise feedback voltage if the detected noise is within the source noise frequency range.

28. The method of claim 27, wherein the structure of a sensor of the noise detection element mirrors the structure of the noise source such that the sensor is tuned to detect the output of the noise source.

29. The method of claim 21, wherein the power converter, the controller, the noise detection element and the feedback element are a part of a single integrated circuit.

* * * * *